(12) United States Patent
Upton et al.

(10) Patent No.: US 6,396,801 B1
(45) Date of Patent: May 28, 2002

(54) ARBITRARY WAVEFORM MODEM

(75) Inventors: Eric L. Upton, Redondo Beach; Michael G. Wickham, Rancho Palos Verdes, both of CA (US)

(73) Assignee: TRW Inc., Redondo Beach, CA (US)

( * ) Notice: Subject to any disclaimer, the term of this patent is extended or adjusted under 35 U.S.C. 154(b) by 0 days.

(21) Appl. No.: 09/120,851

(22) Filed: Jul. 22, 1998

Related U.S. Application Data

(63) Continuation-in-part of application No. 09/042,928, filed on Mar. 17, 1998, now Pat. No. 6,167,024.

(51) Int. Cl.[7] .............................................. H04B 10/04
(52) U.S. Cl. ..................... 370/204; 375/222; 359/152; 359/181
(58) Field of Search ................................. 370/203, 204, 370/208, 209, 465; 359/122, 156, 192, 113, 124, 125, 152, 114, 115, 118, 154, 174, 175, 176, 180, 181, 189; 375/219, 220, 222

(56) References Cited

U.S. PATENT DOCUMENTS

| | | | |
|---|---|---|---|
| 3,568,102 A | | 3/1971 | Tseng et al. |
| 3,744,039 A | | 7/1973 | Hrbek et al. |
| 4,084,182 A | | 4/1978 | Maiman |
| 4,767,198 A | | 8/1988 | Solie et al. |
| 4,862,406 A | | 8/1989 | Fisher |
| 4,866,699 A | | 9/1989 | Brackett et al. |
| 4,905,253 A | | 2/1990 | Chraplyvy et al. |
| 4,956,798 A | | 9/1990 | Dinteman |
| 5,111,451 A | * | 5/1992 | Piasecki et al. ............. 370/203 |
| 5,311,344 A | | 5/1994 | Bohn et al. |
| 5,321,541 A | | 6/1994 | Cohen |
| 5,388,088 A | * | 2/1995 | Gans et al. ................. 359/122 |
| 5,615,035 A | * | 3/1997 | Koai .......................... 359/119 |
| 5,675,674 A | | 10/1997 | Weis |
| 5,694,232 A | * | 12/1997 | Parsay et al. ............... 359/113 |
| 5,703,708 A | | 12/1997 | Das et al. |
| 5,732,097 A | | 3/1998 | Yamaguchi et al. |
| 5,742,423 A | | 4/1998 | Ido et al. |
| 6,167,024 A | * | 12/2000 | Upton et al. ................ 370/203 |

* cited by examiner

Primary Examiner—Ricky Ngo
(74) Attorney, Agent, or Firm—Katten Muchin Zavis

(57) ABSTRACT

An improved communication system which provides improved spectral efficiency as well as relatively low co-channel interference modulation characteristics relative to known communication systems. In particular, the communication system includes a modem that includes an arbitrary or chaotic waveform generator and a chaotic waveform demodulator configured as a sliding window correlator that is adapted to modulate and demodulate an arbitrary or chaotic waveforms. The modulator includes a finite impulse response (FIR) filter, for example, formed from tapped delay lines with unequal time delays. The demodulator is formed as a matched filter for recovery of the input data signals. The modem is adapted to transmit either optical or RF waveforms. In order to prevent drift of the tap weights due to temperature drift of the tapped delay lines and other factors, a closed servo loop may be provided for each tap weight. By maintaining the accuracy of the tap weights, the system in accordance with the present invention is adapted to provide arbitrary or chaotic modulation and demodulation of the input data signal thereby providing increased spectral efficiency and improved performance which provides increased data output relative to known communication systems based on modulation of periodic signals while minimizing auto correlation errors.

17 Claims, 8 Drawing Sheets

ARBITRARY WAVEFORM MODEM

CROSS REFERENCE TO RELATED APPLICATIONS

This application is a continuation-in-part of copending commonly owned patent application, Ser. No. 09/042,928, filed on Mar. 17, 1998, entitled Multiple Channel Control Using Orthogonally Modulated Coded Drive Signals, by Eric Upton and Michael Wickham, now U.S. Pat. No. 6,167,024 which issued on Dec. 26, 2000.

BACKGROUND OF THE INVENTION

1. Field of the Invention

The present invention relates to a communication system and more particularly to a arbitrary or chaotic waveform modem which includes an arbitrary waveform generator or modulator and a chaotic waveform demodulator configured as a sliding window correlator which includes non-uniform spaced tapped delay lines and a matched filter for modulating and demodulating chaotic as well as periodic waveforms to provide spectral efficiency heretofore unknown in communications systems.

2. Description of the Prior Art

Modems are well known in the art. Such modems are used to convert data signals to signals suitable for transmission. Such modems normally include a modulator for modulating outgoing data signals which are transmitted either by RF or optically to a demodulator which demodulates the incoming data signals. Both RF and optical modems are known. Optical communications systems are becoming increasingly more popular due to the ever increasing demand for higher data capacity and lower interference. Examples of such optical communication systems are disclosed in U.S. Pat. Nos. 4,084,182; 4,862,406; 4,866,699; 4,905,253; 5,311, 344; 5,321,541; 5,675,674; 5,694,232; 5,703,708; and 5,742,423.

Both RF and optical communication systems are based on modulation of a periodic carrier signal, such as a sine wave. Unfortunately, the use of such periodic carrier signals limits performance and efficiency of the communication system. As such, there is a need for a more efficient and increased performance communication system.

SUMMARY OF THE INVENTION

The present invention relates to an improved communication system which provides improved spectral efficiency as well as relatively low co-channel interference modulation characteristics relative to known communication systems. In particular, the communication system includes a modem that includes an arbitrary or chaotic waveform generator or modulator and a chaotic waveform demodulator configured as a sliding window correlator that is adapted to modulate and demodulate arbitrary or chaotic waveforms. The modulator includes a finite impulse response (FIR) filter, for example, formed from tapped delay lines with unequal time delays. The demodulator is formed as a matched filter for recovery of the input data signals. The modem is adapted to transmit either optical or RF waveforms. In order to prevent drift of the tap weights due to temperature drift of the tapped delay lines and other factors, a closed servo loop may be provided for each tap weight. By maintaining the accuracy of the tap weights, the system in accordance with the present invention is adapted to provide arbitrary or chaotic modulation and demodulation of the input data signal thereby providing increased spectral efficiency and improved performance which provides increased data rates and quality relative to known communication systems based on modulation of periodic signals.

BRIEF DESCRIPTION OF THE DRAWINGS

These and other objects of the present invention will be readily understood with reference to the following specification and attached drawing wherein:

FIG. 5($b$) is a block diagram of a photonic signal processing demodulator including the orthogonal pilot tone servo controller illustrated in FIG. 1 in accordance with the present invention;

DETAILED DESCRIPTION

The present invention relates to a arbitrary or chaotic waveform modem which provides increased spectral efficiency and increased performance relative to known modems which are based on periodic waveforms. The arbitrary or chaotic waveform modem is configured as a sliding window correlator and includes a modulator which includes finite impulse response (FIR) filter and a demodulator with a matched filter. The tapped delay lines of the FIR filter are formed with different time delays which enables the modem to generate an arbitrary or chaotic waveform. In order to prevent the system from causing gross decorrelation due to drifting of the tap weights of individual time delay lines each of the taps, as discussed in detail below, may be controlled by a closed servo loop. By controlling the tap weight accuracy, the system in accordance with the present invention is adapted modulate input data into chaotic and arbitrary waveforms which provides several benefits. For example, the system allows selection of infinitely variable tap spacing, which, in turn, allows the modulated waveform to be any shape, non-periodic or periodic. Moreover, since the taps of the system may be non-uniform, the phasing of the chip, baud or symbol can be arbitrarily made any value including prime or an irrational multiple which degenerate rate line formations and makes the detection improbable. In addition, co-channel interference is reduced relative to known systems because the cross correlation between orthogonally selected waveforms diminishes. Although the modem is described and illustrated in terms of an optical modem the principles of the present invention are also applicable to non-optical modems, such as electronic modems.

Figure 6A:
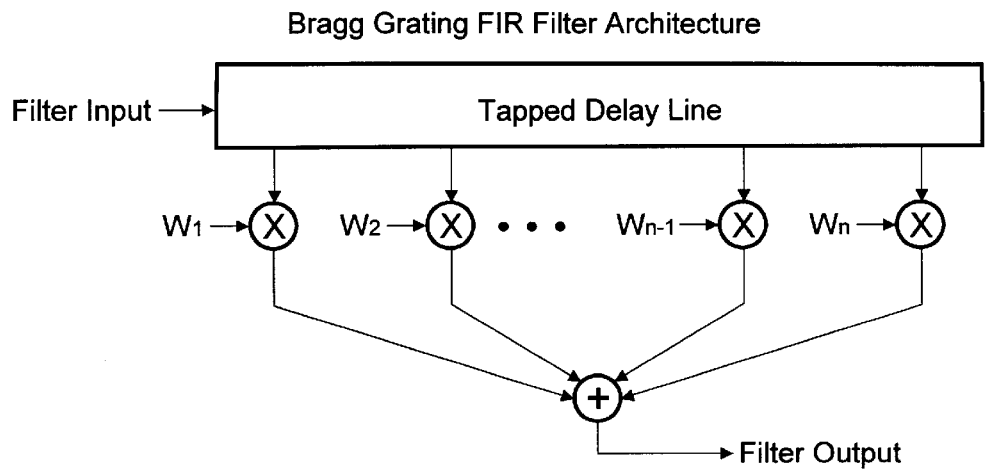
FIGS. 6($a$) and 6($b$) are block diagrams illustrating a conventional architecture for a finite impulse response (FIR) filter and a infinite impulse response (IIR) filter.
Figure 6B:
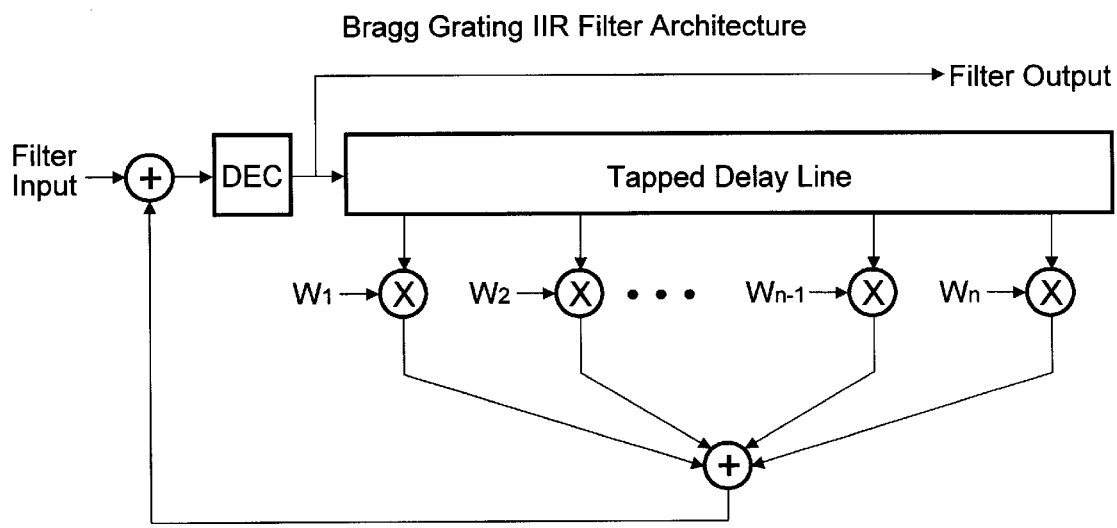
Figure 7:
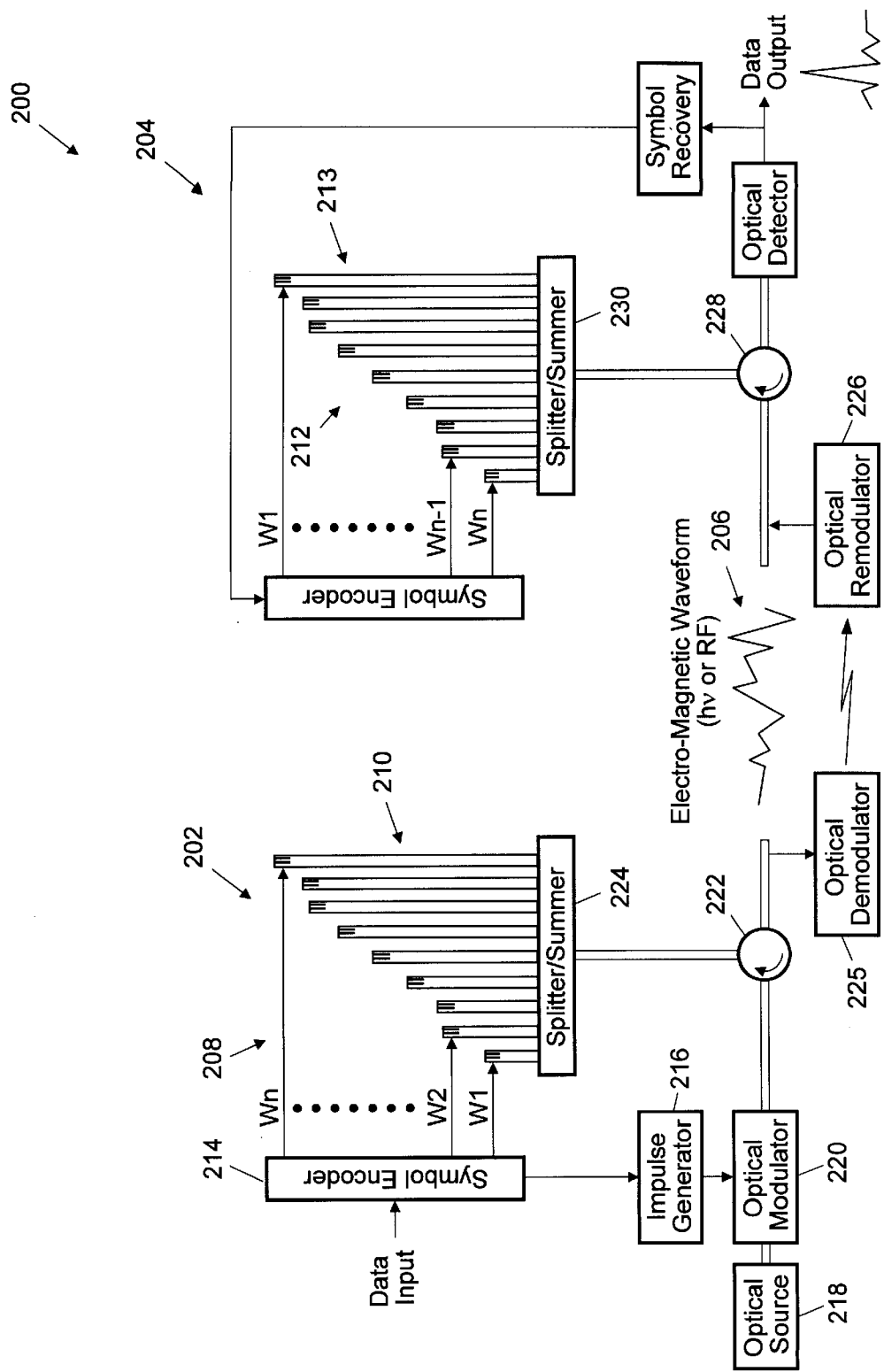
FIG. 7 is a block diagram of an arbitrary or chaotic waveform modem in accordance with the present invention.
Figure 8:
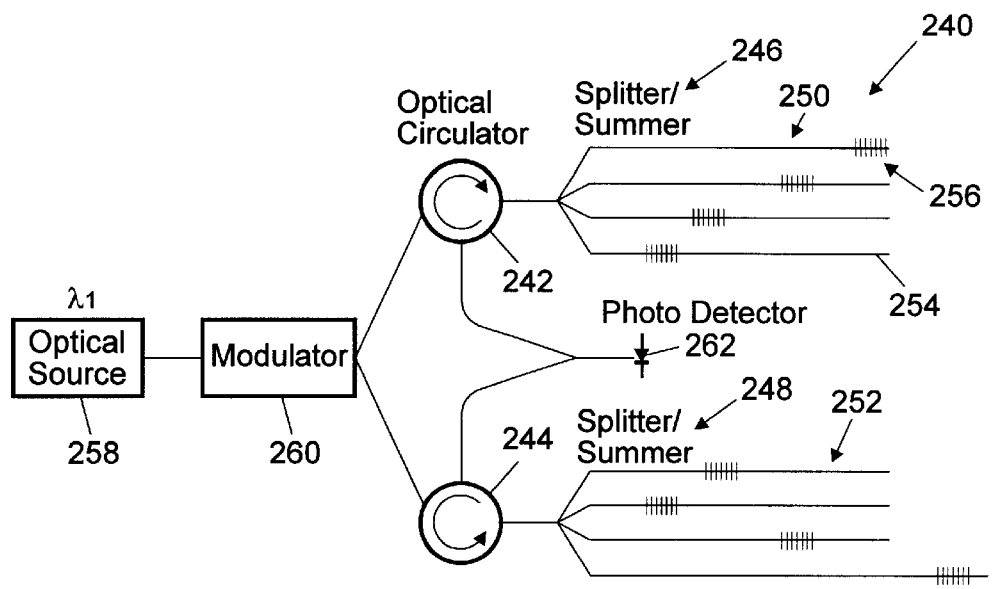
FIG. 8 is a simplified block diagram of the embodiment illustrated in FIG. 7, shown with a plurality of splitter/ summers and tapped delayed line filters.
Figure 9:
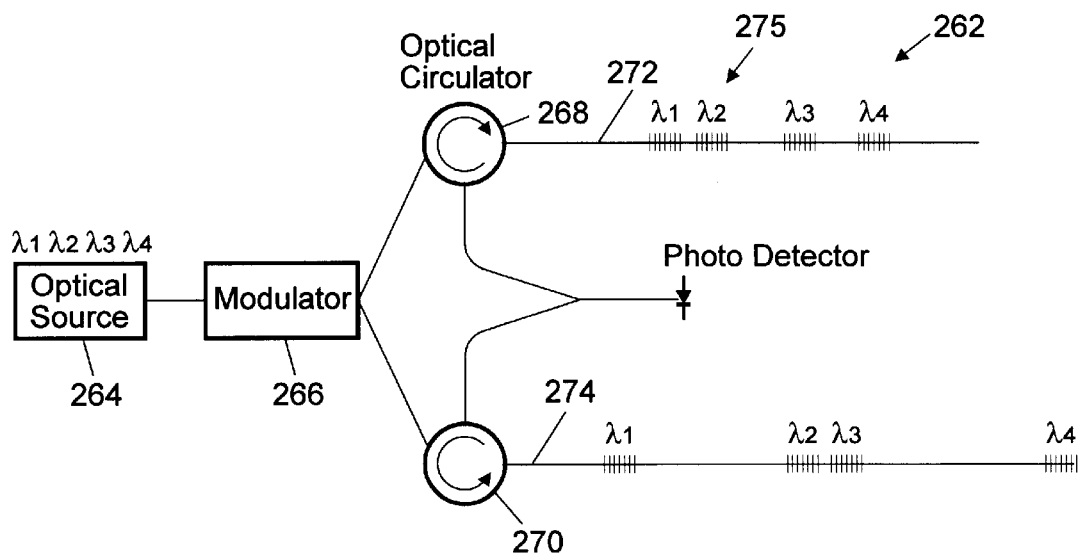
FIG. 9 is an alternate embodiment of the system illustrated in FIG. 8 which provides reduced optical losses and includes an optical source which generates light with multiple wavelength components.

A key aspect of the invention relates to the non-uniform tapped delay lines which enables a chaotic waveform to be generated. As known in the art, such tapped delay lines, for example, formed from fiber optics with Bragg gratings, are known to be implemented as finite impulse response (FIR) and infinite impulse response (IIR) filter architectures as shown in FIGS. 6(a) and 6(b). In both said filter architectures, the tapped delay lines are known to be formed with Bragg gratings, for example at uniform spacings. In accordance with an important aspect of the present invention, the arbitrary or chaotic waveform modem includes a FIR filter with non-uniform tap spacing which allows virtually any waveform, chaotic and even periodic, to be generated. The arbitrary or chaotic waveform modem is illustrated in FIGS. 7 and 8. An alternate embodiment of the arbitrary or chaotic waveform generator is illustrated in FIG. 9. As discussed below, the tap weights for the filters may be controlled by a closed servo loop, illustrated in FIGS. 1–5 and discussed below.

TAP WEIGHT CONTROL

Figure 1:
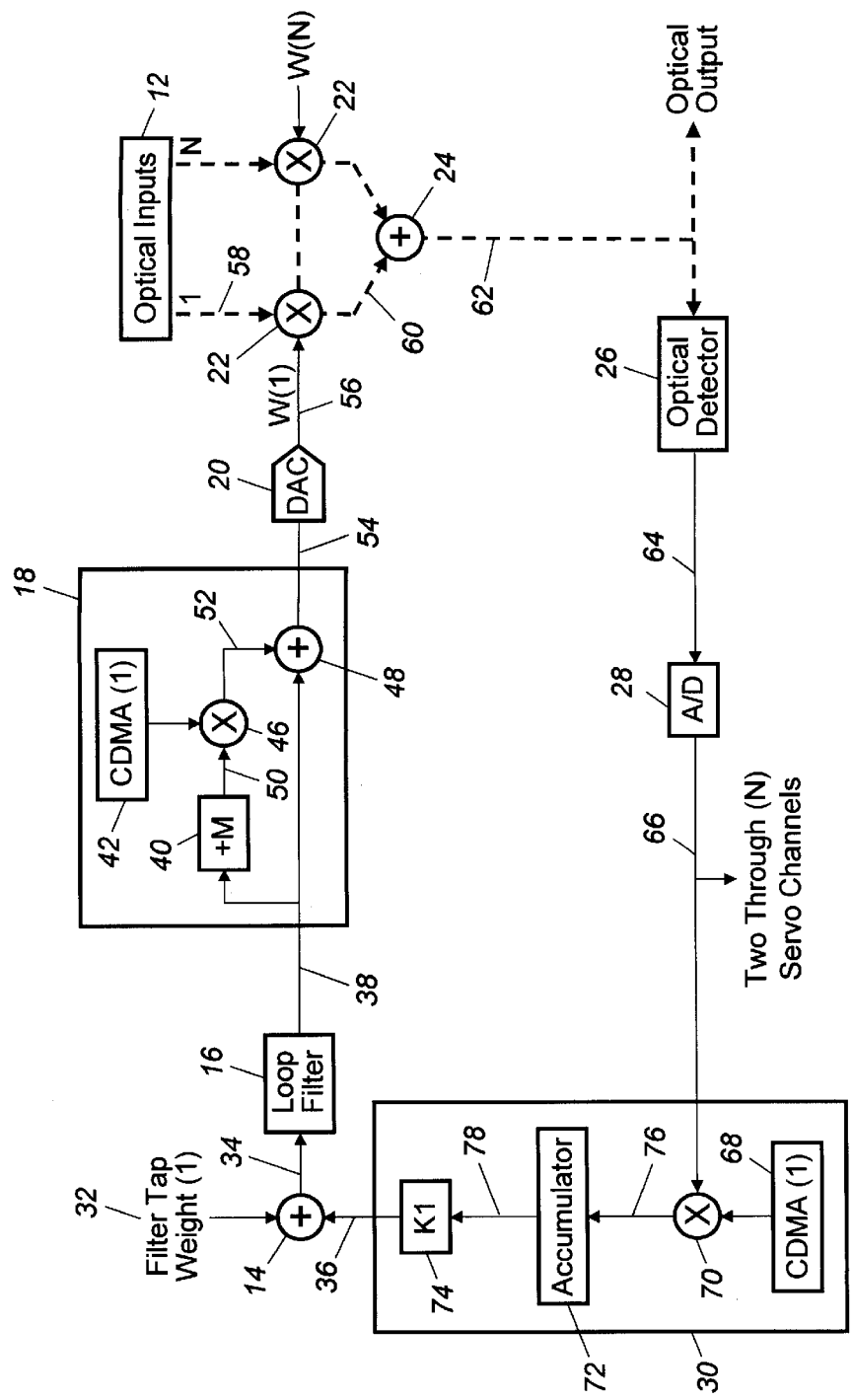
FIG. 1 is block diagram of an orthogonal pilot tone servo controller for providing servo loop control in accordance with the preferred embodiment of the present invention.

Referring to FIG. 1, an orthogonal pilot tone servo controller 10 for providing servo loop control for each of the taps in a delay line signal processor 12 is illustrated. As described in detail, each servo acquires its independence from the other tap's servos utilizing an orthogonal code modulated on top of an existing tap value. The orthogonal code modulations are attenuated in amplitude such that the code modulations are transparent to the processed signals of interest, but the code's length enables each tap's feedback signal to be independently recovered from the aggregate of signals and codes through processing gain realized in each loop's recovery circuit. A plurality of taps can thus be servo controlled simultaneously, providing for extremely wide bandwidth processes which can be performed accurately with digital controls. Rather than depending on a calibrated relationship between temperature and modulator tap value over time and temperature or some other indirect relationship, the present invention provides a direct method for servo thus providing exact feedback solutions. Consequently, fast, accurate, stable and high performance modulator tap control is realized.

In a general aspect, the system provides a method for providing closed loop control for a control system consisting of a multiplicity of actuators or other controlled entities, each actuator or entity having a value, position, or output signal, including the steps of modulating each of the signals with an attenuated unique code modulation such that the amplitude of the code modulation is less than the signal to generate a modulated signal, summing each of the modulated signals to generate an aggregate signal, detecting the aggregate signal, distinguishing each signal from the others in the aggregate signal utilizing the unique code for each signal, thereby establishing simultaneous control for the plurality of actuators or other controlled entities which maintaining independence between the signals and generating a filtered signal, demodulating the filtered signal to generate a demodulated error signal to the signal for each actuator or controlled entity, thereby providing servo loop control for the actuator or controlled entity. For example, the present invention can be utilized to provide servo control to elements in a phased array antenna, or other complex positioning systems such as robotic controls. The present invention can also be utilized to provide servo control for adaptive FIR filters or IIR filters which can be integrated in high speed communications data links, wide band local area networks, modems and wide band filtering and adaptive equalization devices. The present invention is particularly useful for providing control to conventional or newly-developed semiconductor optical components, such as semiconductor lasers utilizing Bragg gratings for wavelength selection.

Referring to FIG. 1, the orthogonal pilot tone servo controller 10 is utilized to provide servo control for the N-tap delay line of an optical device 12, such as an adaptive filter, specifically an N-tap FIR filter having adjustable tap weights. In particular, the orthogonal pilot tone servo controller 10 generates a set of corrected tap weights for the optical device 12. The signal from each tap is individually adjusted (attenuated or amplified) such that, when brought together in a summer 24, the composite optical signal processor possesses the desired frequency response between the input to the optical processor and the output of the optical processor. The signal processors and processing can be automatically adjusted with electronically variable amplifiers in the taps or by other conventional or newly developed means.

As is illustrated in FIG. 1, the orthogonal pilot tone servo controller 10 for the optical processor includes a summer 14, loop filter 16, modulator 18, digital to analog controller (DAC) 20, mixers 22, optical summer 24, optical detector 26, analog to digital converter (A/D) 28 and demodulator 30. The solid path lines in FIG. 1 represent the electrical pathways while the dashed lines represent optical pathways. Although for exemplary purposes the orthogonal tone pilot servo controller 10 is shown providing servo control for a single tap, the present invention may be utilized to provide servo control for each tap in the delay line of the optical processor 12. As is well known in the art, each tap in the N-tap delay line of an optical component, such as a FIR filter, is assigned a value commonly referred to as the filter tap weight 32. The value assigned to each tap is generally dependent on the filtering characteristics desired and is generally supplied by a computer control interface (not shown).

Referring to FIG. 1, a filter tap weight error signal 34, comprised of a filter tap weight 32 and demodulated tap weight signal 36 which have been combined in the summer 14, is applied to the loop filter 16. The loop filter 16 optimizes the closed loop transfer function of the servo and removes any unwanted signals or harmonics. The filter tap weight signal 38 at the output of the loop filter 16 is applied to the orthogonal code modulator 18 which modulates the filter tap weight signal 38 with a unique code from an orthogonal code set.

Each tap's servo acquires its independence from the other tap's servos utilizing a unique orthogonal code modulated on top of the existing tap value or signal. The modulator 18 includes a scalar 40, coder 42, mixer 46 and adder 48. The filter tap weight signal 38 is initially attenuated by a scalar 40 which divides the filter tap weight signal 38 by a scaling constant M, thus allowing the filter tap weight signal 38 to be code modulated at a desired amplitude. The value of the proportionality constant M may be determined in accordance with numerous factors, including but not limited to, a value which would maintain the amplitude of the modulated signal small in comparison to the processed signals of interest and minimize the impact of any dither on the processed signals of interest. The resultant orthogonal code modulations are thus preferably attenuated in amplitude such that the code modulations are transparent to the processed signals of interest.

The scaled filter tap weight signal 50 is then multiplied with the desired orthogonal code via mixer 46. The code is generated by the coder 46, preferably an orthogonal code division multiple access (CDMA) coder 42. The code sequences provided by the CDMA coder 42 are preferably orthogonal, with zero or near zero cross-correlation. For example, orthogonal codes such as Gold or Walsh codes may be utilized.

The coded filter tap weight signal 52 is added to the filter tap weight signal 38 via the summer 48 to generate a modulated filter tap weight signal 54 modulated by the orthogonal code set as described above. The orthogonal code set of several thousand chips (e.g., 2047) is transparent to the filtered tap weight signal of interest, but the code's length enables each tap's feedback signal independent recovery from the aggregate of signals and codes through processing gain realized in each loop's recovery circuit. A plurality of taps can thus be served simultaneously. The DAC 20 converts each digital modulated filter tap weight signal 54 to an analog modulated tap weight signal W(1) 56, which is then multiplied with the respective optical input 58 via mixer 22.

In particular, the optical input 58 is coupled from a delay line having N multiple taps, shown as the optical inputs in FIG. 1. Each of the N number of taps is multiplied in mixer 22 by the corresponding modulated tap weight signal W(1) through W(N) and summed together by the summer 24. A weight is thus set on a tap and maintained over time and temperature for the N number of taps in the optical signal processor 12. The modulated filter tap weight signals 60 are summed together into one aggregate signal 62 at the summer 24 and applied to a single downstream optical detector 26.

The optical detector 26 converts the optical aggregate signal 62 into a detected signal 64. The A/D converter 28 converts the detected signal 64 to a digital signal 66. The digital signal 66 is applied to each tap's servo controller. FIG. 1 shows the servo controller for tap 1 only. In each tap's servo controller, the digital signal 66 is applied to the demodulator 30, which correlates the digital signal 66 with the corresponding orthogonal CDMA code used to modulate the tap of interest thereby distinguishing each filter tap weight signal within the aggregate digital signal 66 from each other. In particular, each code's length will enable each tap's servo controller to independently recover the tap's feedback signal from the aggregate of signals and codes through processing gain realized in each loop's recovery circuit. The present invention thus establishes simultaneous control while maintaining independence between the filter tap weight signals. Independence is achieved by modulating each tap with a code, preferably an orthogonal code having zero cross correlation characteristics as described above, which can be independently detected and served. To determine the status of each tap, each one of the codes can subsequently be filtered independently.

The demodulator 30 includes a corresponding CDMA coder 68 for correlation, mixer 70, accumulator 72 and scalar 74. The digital signal 66 is multiplied with the coder 68 via the mixer 70. The demodulated tap weight signal 76 at the output of the mixer 70 is applied to the accumulator 72, which accumulate each chip of the particular code for tap N thereby providing the necessary processing gain to extract the state of tap N. The demodulated tap weight signal 78 is then applied to a constant of proportionality 74, which adjusts the signal 78 by a constant factor K. The adjustment factor K, is used to relate the different loop gains which occur during detection and insertion loss which occurs over different parts of the system. The demodulated tap weight signal 36 is then applied to the summer 14, thereby completing the closed servo control loop.

Figure 2:
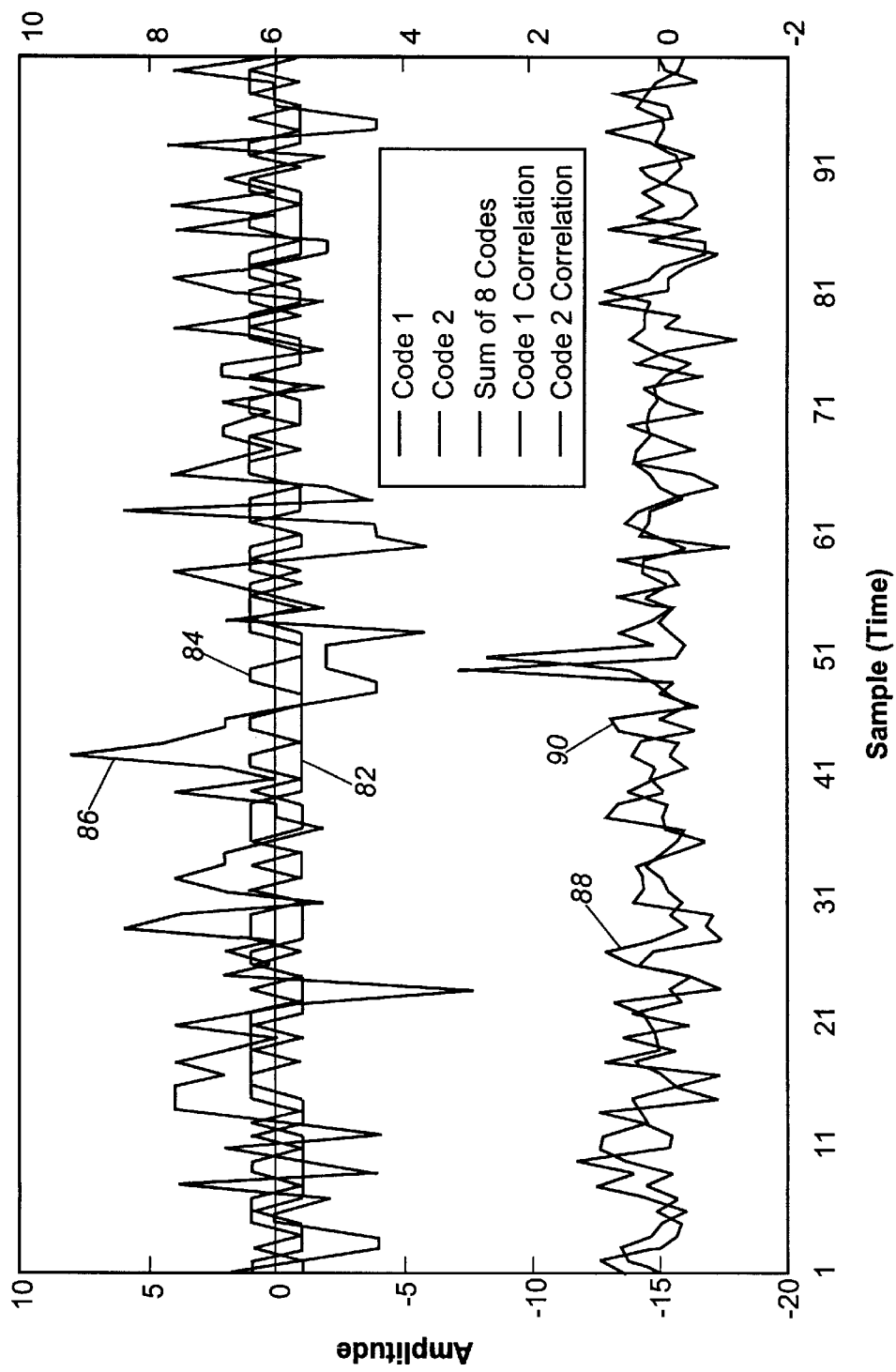
FIG. 2 is a graph of orthogonal code signals which may be utilized in the orthogonal pilot tone servo controller illustrated in FIG. 1.

Each one of the taps in the delay line is modulated with an orthogonal code, summed together at the optical detector and filtered back out. Referring to FIG. 2, a simulation graph 80 of orthogonal code signals in the orthogonal pilot tone servo controller 10 is illustrated. In particular, the top traces show individual first and second codes 82 and 84, respectively, plotted on top of one another. A plot showing the summation of eight codes 86 (including the first and second codes) in accordance with the present invention is also illustrated. The bottom traces shows the auto correlation signals 88 and 90 of the first and second code, respectively. Thus, even though they are all summed together, each one of the codes can be filtered independently out to determine the status of each tap. Because the taps are modulated with unique orthogonal codes, the taps can be distinguished from one another during the servo process, thereby establishing efficient and simultaneous servo control while maintaining independence between the servo channels.

Figure 3:
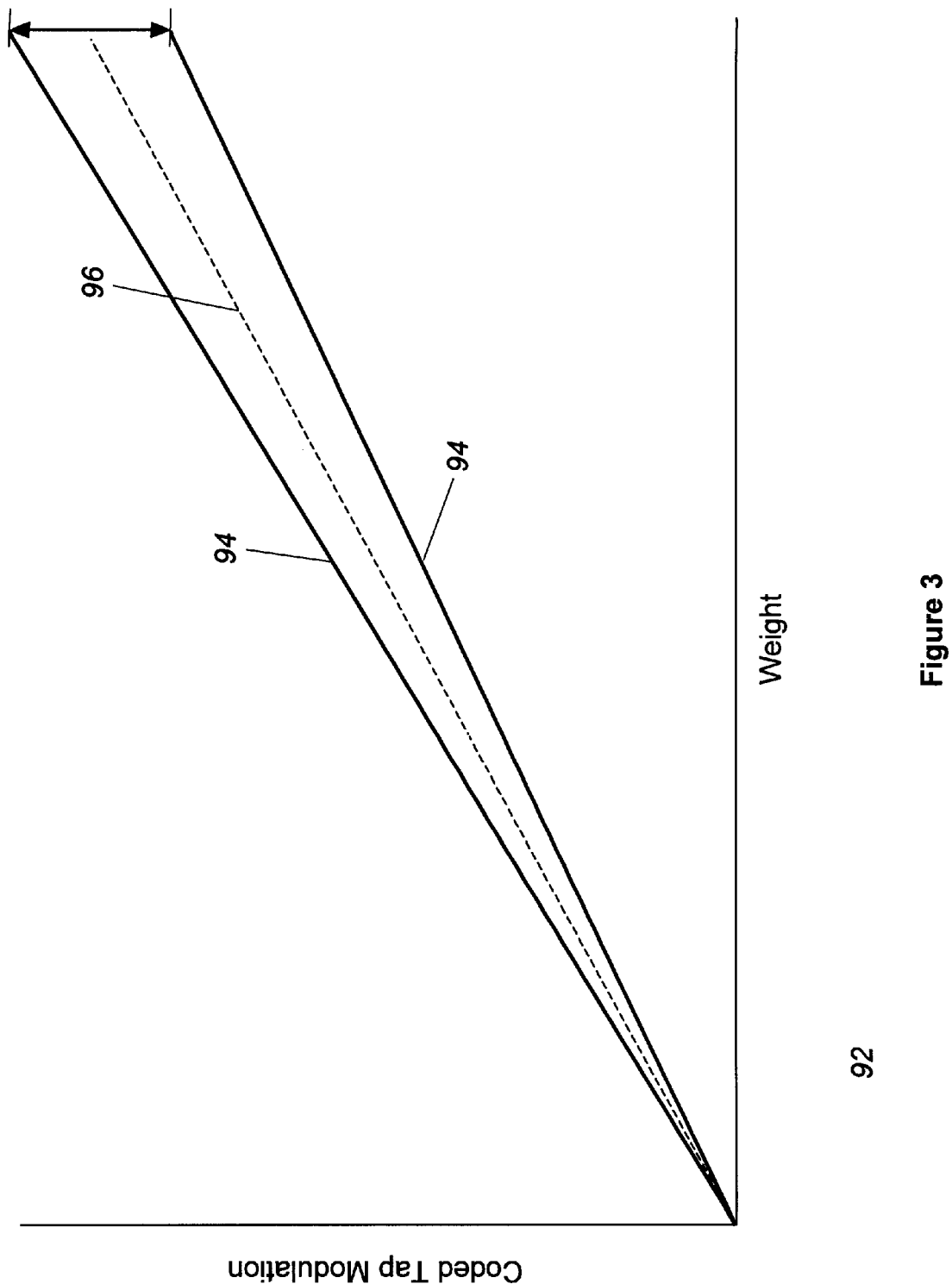
FIG. 3 is a graph of a coded tap modulation envelope in accordance with the present invention.

Referring to FIG. 3, a graph 92 of a coded tap modulation envelope 94 is illustrated. The two solid lines represent the coded tap modulation envelope 94 while the dashed lines represent the desired tap weight 96. Referring to FIGS. 1 and 3, as the particular tap weight is increased, the scaling constant M can be utilized to maintain the amplitude of the modulated signal small in comparison to the processed signals of interest. The coded tap modulation envelope 94 is a continuously increasing envelope which is a function of the weight per tap. The present invention utilizes an orthogonal CDMA code to realize one optical coefficient from another. While the CDMA code modulation allows one optical tap to be independently sorted from another, the amplitude modulation allows the state of that particular tap to be derived, thus giving the value at which the tap is set and providing the necessary feedback signal for that tap's servo controller.

Figure 4:
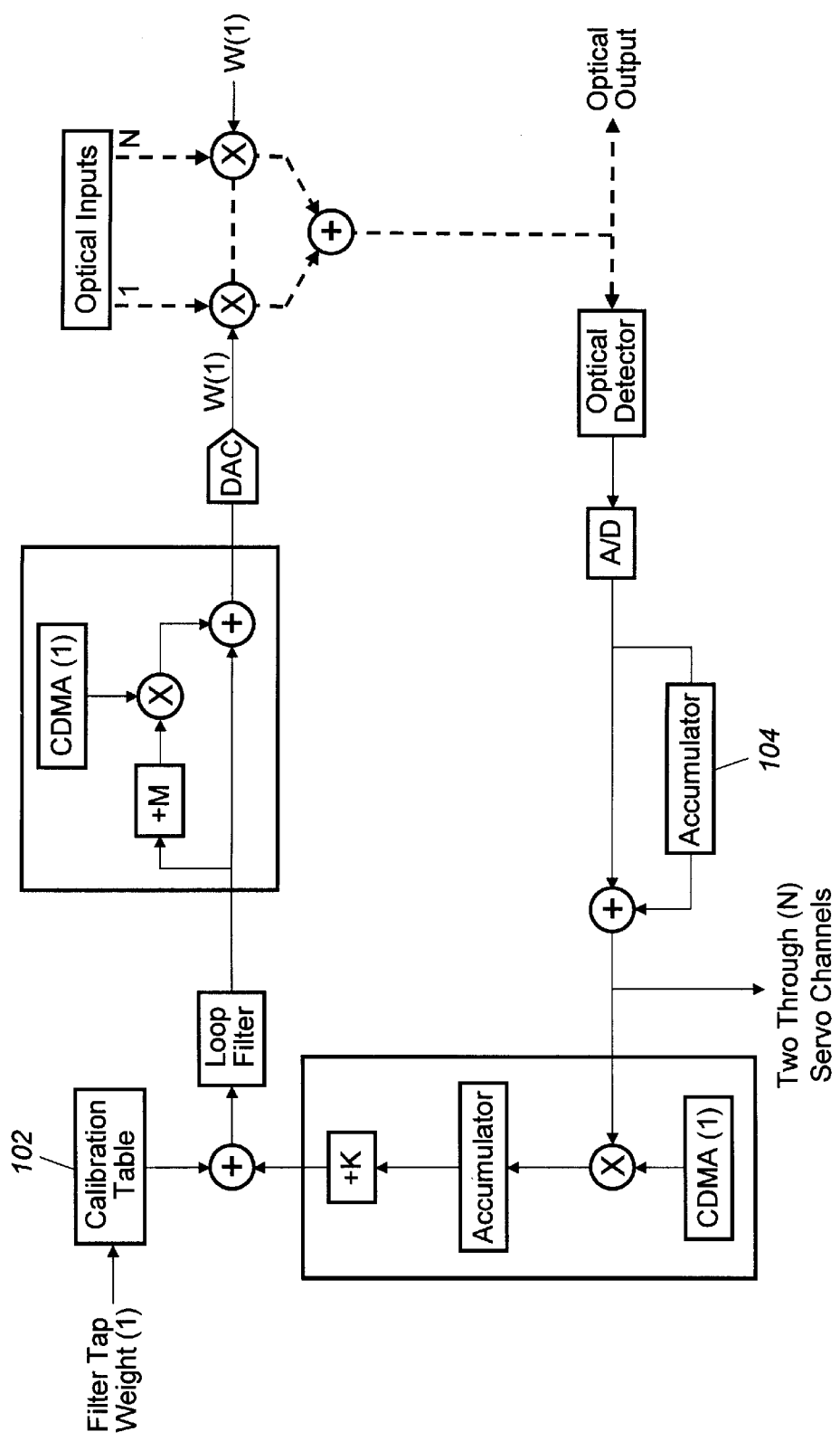
FIG. 4 is block diagram of a orthogonal pilot tone servo controller for providing servo loop control in accordance with an alternative embodiment of the present invention.

Referring to FIG. 4, in accordance with another embodiment of the invention, an orthogonal pilot tone servo controller 98, having similar components and operation as the controller 10 shown in FIG. 1 except for the inclusion of a calibration table 102 and accumulator 104, is shown. The calibration table 102 provides calibrated values for non-linear 3inputs and stores values of weights for achieving a desired transform. For example, the weight values for an equalizer or filter can be stored in the calibration table 102 such that the values can be retrieved from the table as with conventional preprogrammed filters. The orthogonal pilot tone servo controller 100 can also alternatively include an accumulator 104 for filtering the aggregate signal.

Figures 5A, 5B:
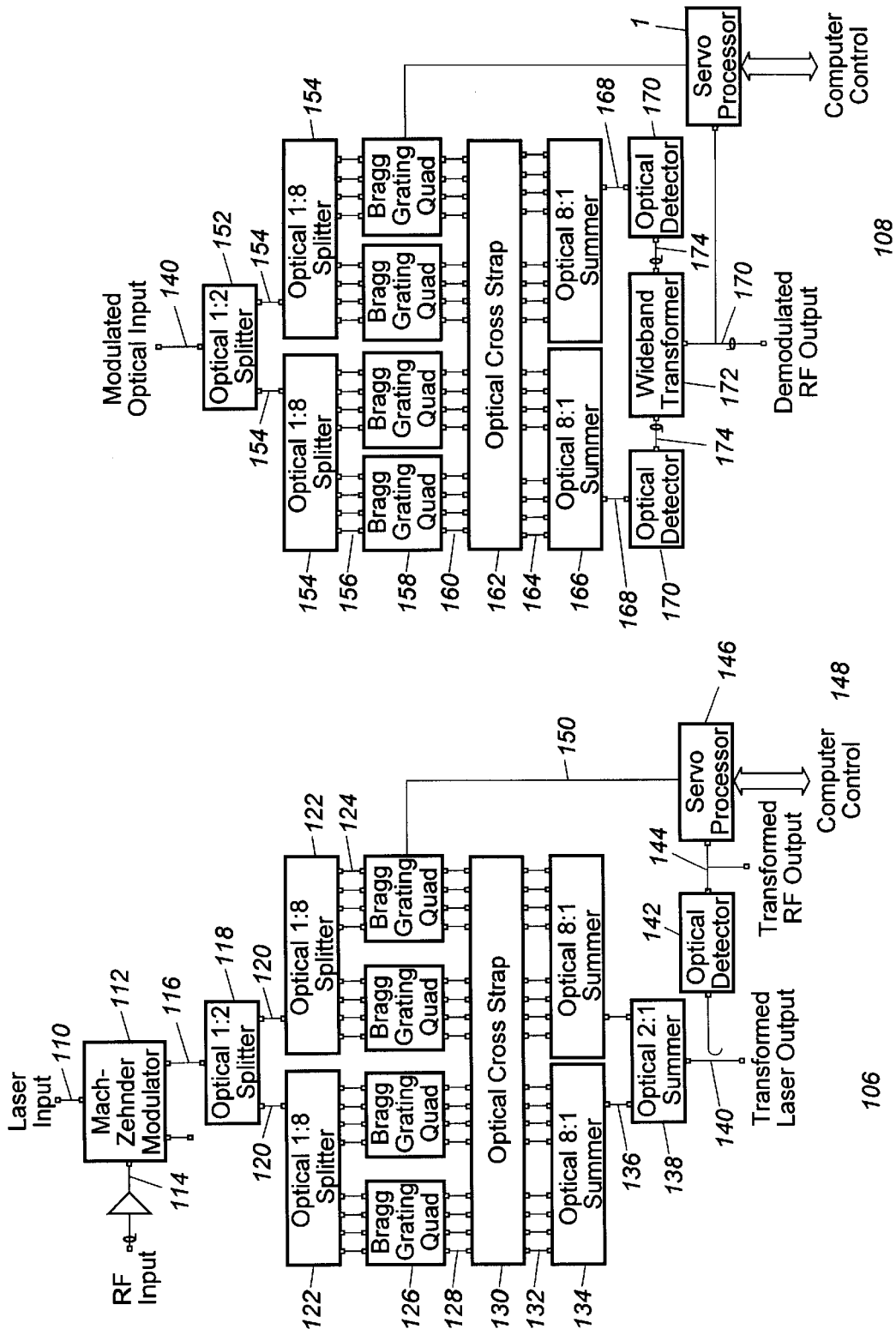
FIG. 5($a$) is a block diagram of a photonics signal processing modulator including the orthogonal pilot tone servo controller illustrated in FIG. 1 in accordance with the present invention.

Referring to FIG. 5(a), a photonics modulator system 106 utilizing the orthogonal pilot tone servo controller 10 illustrated in FIG. 1 is shown. The corresponding demodulator 108 is illustrated in FIG. 5(b). Referring to FIG. 5(a), an incoming optical carrier signal 110 from a short coherence length optical source (not shown), such as a semiconductor laser, is initially applied to a Mach-Zehnder modulator 112 which modulates the optical carrier signal with an RF input signal 114. The Mach-Zehnder modulator 112 may be a commercially available modulator, such as Model No. YB 150-120T-1-3-C-det-4, available from Uniphase Telecommunication Products of Bloomfield, Conn.

The modulated signal 116 is then applied to an 1×2 optical splitter 118 which places a portion of the modulated signal 116 onto two output paths 120. Each output path 120 optically communicates with an 1×8 optical splitter 122, which each places a portion of the split signal onto eight output paths 124. The optical splitters 118 and 122 may be selected from any optical device which can divide an input optical signal and place it onto plural output paths. For example, optical splitters which may be utilized include 1×2 wideband single mode splitters available under Model No. SM-1×2-M-250 and 1×8 wideband single mode splitters under Model No. SM-1×8-M-8R, both models of which are available from Photonic Integration Research, Inc. of Columbus, Ohio.

Each output path 124 optically communicates with a Bragg grating quad 126 which reflects the selected wavelength and transmits all other wavelengths. The Bragg grating quad 126 generally includes a series of photoinduced refractive index perturbations in an optical fiber which causes the reflection of optical signals within a selected wavelength band. The grating wavelength of maximum reflectivity is selected for each one of the incident optical inputs. In an exemplary embodiment, the orthogonal pilot tone servo controller 10 shown in FIG. 1, is utilized to provide servo control to the Bragg grating quads 126 such that the grating wavelength locks to a desired wavelength for each of the optical input. In particular, the output 128 of the Bragg grating quads, signals 1 through N, is applied to an optical cross strap 130, which interconnects the signals 128 in different desired configurations and lengths. The signals 132 output from the optical cross strap 130 are brought together in 8×1 optical summers 134 whose output 136 is applied to a 2×1 optical summer 138. The 8×1 and 2×1 optical summers 134 and 138, respectively, may be any optical component which combines plural wavelengths into a single optical medium. The optical splitters 118 and 122 described above, operated in reverse fashion such that the splitters function as combiners, may be utilized.

An optical detector 142 measures the transformed short coherence length optical output 140 which is transmitted from the gratings 126 via the optical cross strap 130 and summers 134 and 138 and converts the transformed short coherence length optical output 140 to an electrical signal, the transformed RF output signal 144. The transformed RF output signal 144 is the modulated RF input. It is also applied to the servo processor 146, which utilizes the concepts of the orthogonal pilot tone servo controller 10 illustrated in FIG. 1 and described above to provide servo control to the Bragg grating quads 126. A computer control interface 148 provides the tap factors to be adjusted in accordance with FIG. 1. Although illustrated as a single path 150, the servo path from the servo processor to the Bragg grating quads 126 corresponds to inputs W(1) through W(N) in FIG. 1. The single path line 150 thus actually represents 16 path lines in the configuration shown in FIG. 5(a).

Each one of the taps corresponding to the 16 path lines is modulated with an attenuated orthogonal code, summed together in summers 134 and 138 and detected by an optical detector 142 and filtered back out. Even though they are all summed together, each one of the codes can be independently filtered out to determine the status of each tap. Because the taps are modulated with unique orthogonal codes, the taps can be distinguished from one another during the servo process, thereby establishing efficient and simultaneous servo control while maintaining independence through the servo channels.

The servo control provided can be utilized to modify the Bragg grating's reflection wavelength band in accordance with the wavelength of an incident optical input generating the transformed short coherence length optical output. In particular, a control signal responsive to the electrical signals received from the optical detector is sent to the Bragg grating wavelength control system inside the Bragg grating quad by path line 150. The control signal modifies the grating wavelength band of high reflectivity.

Referring to FIG. 5(b), a demodulator 108 utilizing the concepts of the orthogonal pilot tone servo controller 10 of FIG. 1 is illustrated. In particular, the optically transformed short coherence length optical output from the modulator 140 shown in FIG. 5(a) is applied to the demodulator 108 in FIG. 5(b) which performs the inversion of modulation (i.e. demodulation) by match filter detecting the waveform which is transmitted from the modulator 106.

In particular, referring to FIG. 5(b), the modulated optical input 140 is applied to the 1×2 optical splitter 150 which places a portion of the multiplexed signal onto two output paths 152. Each output path 152 optically communicates with 1×8 optical splitter 154 which places a portion of the split signal 154 onto eight output paths each 156. Each output path 156 optically communicates with one of the Bragg grating quads 158, the output 160 (signals 1 through N) of each of which is applied to the optical cross strap 162 for interconnecting the signals 160 in different configurations and different. The signals 164 output from the optical cross strap 162 are brought together in 8×1 optical summers 166. The output signal 168 from each 8×1 summer 166 is applied to an optical detector 170 for detecting each output signal 168. A transformer 172, preferably wideband, is coupled to receive and combine the outputs 174 from each of the optical detectors 170. The output 176 from the transformer 172 is applied to the servo processor 178, which utilizes the concepts of the orthogonal pilot tone servo controller 10 illustrated in FIG. 1 and described above.

The orthogonal pilot tone servo controller 10, regardless of whether it is connected in series or parallel, may be positioned virtually anywhere in a system to provide control, as long as there is a single detector, such as a diode detector, to distinguish the tap signals from one another. For example, the servo controller 10 can be used for adjusting the path amplitude, polarization, or length of an optical component. Each controller 10 would only require an orthogonal code set for modulating signals, a common single detector for detecting the aggregate, and a match filter for ferreting signals out from the aggregate detected signal and filtering the signals back for adjustment and control. The signals are ferreted out utilizing the orthogonal code set, in a manner that is independent of any other optical processing functions.

Furthermore, the control system is also not limited by the architecture of the optical processor. For example, even for optical processors requiring more than one detector, such as in the case of processors including bipolar tap weights—necessitating the use of two different detectors, the implementation of the controller 10 of the present invention requires just a single detector. Moreover, existing diode detectors in a signal processing system can be utilized to provide detection in the controller 10, thereby minimizing the amount of hardware required.

The control system can also take advantage of common mode rejection techniques to minimize errors. In particular, since all the signals are routed to a single detector, anything that is introduced as an error from the detector (e.g., an offset, gain, variance or drift) may be considered common mode and is rejected.

ARBITRARY OR CHAOTIC WAVEFORM MODEM

The arbitrary or chaotic waveform modem in accordance with the present invention is illustrated in FIG. 7 and generally identified with the reference numeral 200. The arbitrary waveform modem 200 includes an arbitrary or chaotic waveform generator or modulator portion 202 and a chaotic waveform receiver or demodulator portion 204 configured as a sliding window correlator. The modulator portion 202 and the demodulator portion may be identical and may be operated in a half duplex mode in order to reduce hardware. As will be discussed below, the modulator portion 202 can be configured to generate an RF or an optical output, generally indicated with the reference numeral 206. On the same token, the receiver or modulator portion 204 is adapted to receive either a modulated optical or an RF modulated waveform 206. In accordance with an important aspect of the invention, the modulator portion 202 is configured as an arbitrary waveform generator and is adapted to generate any waveform including a non-periodic or arbitrary waveform as illustrated with the reference 206 and even periodic waveform. As shown, the modulator portion 202 may include a finite impulse response (FIR) filter 208 with a plurality of variable time delay tapped delay lines, generally indicated with the reference numeral 210. The shape of the waveform generated by the arbitrary waveform modem 200 is a function of the tap weights W1 ... WN applied to the tapped delay lines 210 which, in turn, allows a modulator portion 202 to generate arbitrary or chaotic waveforms, such as the waveform illustrated with the reference numeral 206. Of course, depending on the tap weights, the modulator portion 202 may also be used to generate periodic waveforms. As shown, the tapped delay lines 210 are formed from fiber optics with non-uniform spaced Bragg gratings. As discussed above, such Bragg gratings may be formed from a series of photo induced refractive index perturbations in an optical fiber which causes the reflection of optical signals within a selective wavelength band. The grating wavelength of maximal reflectivity is selected for each one of the incident optical inputs from a plurality of different lengths which enable the modulator portion 202 to generate virtually any waveform including a chaotic or arbitrary waveform as indicated with the reference numeral 206. In order to control drifting of the tap weights, W1 ... WN, for example, due to temperature drift, the tap weights W1 ... WN may be controlled by the servo control loop as discussed above. By preventing the tap weights W1 ... WN from drifting, the modem 200 is able to generate any arbitrary or chaotic waveform 206, while minimizing if not eliminating any decorrelation resulting from temperature drift of the tapped delay lines.

The modulator portion 202 and the demodulator portion 204 are configured as a sliding window correlator. The demodulator portion includes a matched filter portion 212. The matched filter portion 212 may be a FIR filter which includes a plurality of tapped delay lines 212 formed from fiber optics with non-uniform spaced Bragg gratings. In order to form a matched filter, the tapped delay lines 212 are formed as a mirror image of the tapped delay lines 210 which form part of the FIR filter 208 in the modulator portion 202. The tapped delay lines in both the modulator portion 202 and the demodulator portion 204 are ideally identical. The mirrored or reflexive tap assignment of the demodulator portion 204 provides for proper matching of the signals from the modulator portion 202 to the demodulator portion 204. In particular, the first and shortest signal from the modulator portion 202 from the tapped delay line corresponding to the weight W1 is correlated with the longest tapped delay line in the demodulator portion 204, and assigned the same tap weight W1. The rest of the tapped lines in the modulator portion 202 are similarly correlated to the tapped delay lines in the demodulator portion 204, so that the signals generated by the demodulator portion 202 are in the proper time delay sequence.

Referring to FIG. 1, data input is applied to the modulator portion 202. The data input may be a digital data word, for example, in the form of a mark space modulated signal. The data input is applied to a symbol encoder 214 in which the data input is translated to set of tap weights, $W1-W1_c$. As discussed above, these tap weights may be tracked by a servo control loop as discussed and illustrated in FIGS. 1–5. In particular, each of the tap weights W1 ... $W1_c$ may be applied to individual servo control loops as illustrated in FIG. 1. As discussed above, each of the servo loops generates a served tap weight signal, identified with the reference numeral 36 in FIG. 1, which compensates for temperature drift in the tapped delay lines. This signal 36 may then be applied as the tap weight signals W1 ... $W1_c$ in the modulator portion 202 as well as the demodulator portion 204.

Upon receipt of the data input, the symbol encoder 214 triggers an impulse generator 216 which modulates light from an optical source 218, such as a semiconductor laser or fiber optic laser through an optical modulator 220. In other words, an optical impulse is created at the output of the optical modulator 220.

The impulse generator 216 may be, for example, a Schmidt trigger, which generates a pulse when triggered by the symbol encoder 214 upon receipt of a data input signal. The optical modulator 220 may be a Mach-Zehnder optical modulator, which are well known in the art. The optical source 218 may be any optical source that has a coherence length that is short compared to the smallest separation in the taps. In the alternative, more optically efficient, embodiment shown in FIG. 9, the optical source may be a set of lasers with long coherence lengths.

The light impulse at the output of the optical modulator 220 is applied to an optical circulator 222 which initially directs the light impulse to a splitter/summer 224. The splitter/summer 224 splits the light signal into a number of channels corresponding to the number of tapped delay lines W1 ... WN. The channelized signals are directed to the various tapped delay lines 210 and reflected back to the splitter/summer 224 after the appropriate time delay by the tapped delay lines 210. The reflected signals from the splitter/summer 224 are reflected back to the optical circulator 222 to form the arbitrary waveform 206. A suitable splitter/summer and optical circulator are well known in the art.

As discussed above, the waveform 206 may be transmitted as either an optical or an RF waveform. In embodiments where the waveform 206 is transmitted as an RF waveform, the output from the optical circulator 222 is applied to an optical demodulator 225 which demodulates the RF signal from the optical signal. In such an application, the RF signal is transmitted to the demodulator portion 212, where it is received by an optical remodulator or modulator 226. The remodulator or modulator 226 may be similar to the optical modulator 220 and formed from a Mach-Zehnder type modulator as discussed above. The optical demodulator 224 may be a commonly known optical detector, such a photodetector or photodiode.

As discussed above, the demodulator portion 204 includes a matched filter 212, such as a FIR filter, which includes a plurality of tapped delay lines 213. The tapped delay lines 213 in the demodulator portion 204 are identical to the tapped delay lines 210 in the modulator portion 202; the only difference being is that the weights W1–WN with their respective time delays are applied in the opposite order as discussed above.

The modulated waveform 206 is received by an optical circulator 228. The optical circulator 206 directs the modulated waveform 206 to a splitter summer 230. The splitter/summer 230, the same as the splitter summer 224, is coupled to a plurality tapped delay lines 213 having the weights assigned in the opposite order than the filter 208, as discussed above. The splitter/summer 230 splits the modulated signal up into a plurality of channels which are, in turn, directed to each of the tapped delay lines 213 and reflected back to the splitter/summer 230 and, in turn, to the optical circulator 228. At this point in the demodulator all impulse delays have been equalized and all weights have been matched yielding a signal maximum. As discussed above, this configuration forms a sliding window correlator. The signals reflected back to the splitter summer 228 are directed to an optical detector 230 which, as discussed above, may be a photodiode. The output from the photodiode is the recovered data output signal 232. The output of the optical detector 230 is also directed to a symbol recovery block 232 which may be a phase locked loop and directed to a symbol encoder 234, similar to the symbol encoder 214. As discussed above, the symbol encoder 234 is used to provide the tap weights W1 . . . WN to the tapped delay lines 213 as discussed above. The symbol recovery block 232 recovers the tap weights in digital form, which, in turn, are applied to the symbol encoder 234 for assigning the various tap weights W1 . . . WN to the tap delay lines 213

In the embodiment illustrated in FIG. 7, the optical source may be any optical source that has a coherence length that is short compared to the smallest separation in the taps. This condition must be met so that the time delayed signals add incoherently and their optical power adds linearly. A system 240 is illustrated in FIG. 8 which is similar to the system 200 illustrated in FIG. 7 except that the system 240 illustrates a modulator portion having two optical circulators 242 and 244 and two splitter summers 246 and 248, as well as two signed filter halves 250 and 252 having multiple tapped delay lines 254 with non-uniform spacing of the Bragg gratings 256. The system 240 also includes an optical, source 258, a modulator 260 and optical detector 262. In this embodiment, the optical source 258 generates an optical signal having a single wavelength $\lambda_1$. The Bragg gratings 256 and each of the tap delay lines 254 are responsive to the selected wavelength $\lambda_1$. For the architecture illustrated in FIG. 8, the optical losses can be relatively high. For example, before the photodetector 262, the optical losses are equivalent to number $2L_{InSplit}+10Log(N)$, where L equals the number of splitter/summers and N equals the number of tapped delay lines per splitter/summer.

An improved architecture is illustrated in FIG. 9, which has significantly reduced losses relative to the architectures illustrated in FIGS. 7 and 8. The improved architecture is generally identified with the reference numeral 262 and includes a optical source 264, a modulator 266, a photodetector 276, a pair of optical circulators 268 and 270, connected to single fiber optic delay lines each having a plurality of Bragg gratings generally identified with the reference numeral 275 at different spacings along the fiber optic lines 272 and 274. As indicated in FIG. 9, the Bragg gratings 275 are written for different frequency components $\lambda_1, \lambda_2, \lambda_3$ and $\lambda_4$ as shown. In this embodiment, the optical source 264 is formed from a optical source having multiple wavelengths components $\lambda_1, \lambda_2, \lambda_3$ and $\lambda_4$. In this embodiment, the optical source can be a set of lasers, each of which can have a very long coherence length. The optical signals from the taps, which add at the detector, are incoherent with respect to each H other, because they have different wavelengths.

Although the total initial optical power for the two optical sources 258 and 264 is equal in the embodiments illustrated in FIGS. 8 and 9, the losses in the architecture 262 illustrated in FIG. 9 before the photodetector 276 is zero, a significant improvement over the architecture 240 illustrated in FIG. 8. For a configuration where N equal 4, the architecture 262 would have 15 dB higher signal levels at the input of the photodetector 276 then the architecture 240. Another benefit of the architecture 262 is that the losses are reduced as the number of splitter summers is increased.

Obviously, many modifications and variations of the present invention are possible in light of the above teachings. Thus, it is to be understood that, within the scope of the appended claims, the invention may be practiced otherwise than as specifically described above.

What is claimed and desired to be covered by a Letters Patent is as follows:

1. An arbitrary waveform modem comprising:
   a modulator portion for modulating a data input signal defining a modulated signal; and
   a demodulator portion for demodulating said modulating signal, wherein said modulator portion includes means for generating any waveform including a non-periodic arbitrary waveform and said demodulator portion includes means for demodulating said wave form from said modulator wherein said generating means includes a plurality of first half delay lines, having at least two different time delays and a first waited tap associated with each of said tap delay lines.

2. The arbitrary waveform modem as recited in claim 1, wherein said pluralities of first half delay lines are configured to form a first filter.

3. The arbitrary waveform modem as recited in claim 2, wherein said filter is a finite impulse response (FIR) filter.

4. The arbitrary waveform modem as recited in claim 2, wherein said demodulating means includes a matched filter such that said modulator portion and said demodulator portion form a sliding window correlator.

5. The arbitrary waveform modem as recited in claim 2, wherein said demodulating means includes a plurality of second tapped delay lines and an associated second weighted tap associated with each second tapped delay line, said second tapped delay lines formed with the same time delays as said first tapped delay lines, said second weighted taps being assigned to said second tapped delay lines to form a matched filter relative to said first filter.

6. The arbitrary waveform modem as recited in claim 5, further including means for compensating drift in at least one of said first and second weighted taps.

7. The arbitrary waveform modem as recited in claim 6, wherein said compensating means includes a servo loop.

8. An arbitrary waveform modem comprising:
   a modulator portion for modulating the data input signal defining a modulated signal; and
   a modulator portion for demodulating said modulated signal wherein said modulator portion includes means for generating any waveform including a non-periodic arbitrary waveform and said demodulator portion includes means for demodulating said waveform from said modulator, wherein said modulating includes a light source for generating light at a single wavelength; and wherein said modulator includes a plurality of first half delay lines formed from fiber optics with a plurality BRAGG gratings at non-uniform spacings.

9. An arbitrary waveform modem comprising:

a modulator portion for modulating a data input signal defining a modulated signal; and a modulator portion for demodulating said modulated signal wherein said modulator portion includes means for generating any waveform including a non-periodic arbitrary waveform and said demodulator portion includes means for demodulating said waveform from said modulator, wherein said modulator portion includes a light source for generating light at a single wavelength; and wherein said modulator portion includes a plurality of first half delay lines formed from fiber optics with a plurality Bragg gratings at nonuniform spacings;

and wherein said Bragg gratings are formed to be responsive to a single wavelength.

10. An arbitrary waveform modem comprising:

a modulator portion for modulating a data input signal defining a modulated signal; and a demodulator portion for demodulating said modulated signal; wherein said modulator portion includes means for generating any waveform including a non-periodic arbitrary waveform and said demodulator portion includes means for demodulating said waveform from said modulator;

wherein said modulating means includes a light source for generating light at a plurality of wavelengths;

and wherein said modulator includes one or more tapped delay lines, each tapped delay line formed from a fiber optic cable with a plurality of Bragg gratings, each Bragg grating responsive to a different wavelength of light.

11. The arbitrary waveform modem as recited in claim 10, wherein said modulator portion includes means for generating a modulated optical signal and said demodulator portion includes means for demodulating said modulated optical signal.

12. The arbitrary waveform generator as recited in claim 11, wherein said source is an optical source which generates light having a plurality of wavelength components.

13. An arbitrary waveform generator for generating an arbitrary or chaotic waveform, the arbitrary waveform generator comprising:

a signal source; and means for generating a non-periodic arbitrary waveform, said generating means including an impulse generator and a modulator for modulating input data applied to said generating means on to said signal source, wherein said generating means includes a plurality of tap delay lines and wherein said tap delay lines are formed from fiber optic cables with one or more BRAGG gratings.

14. The arbitrary waveform generator as recited in claim 13, wherein said Bragg gratings are responsive to a single wavelength.

15. The arbitrary waveform generator as recited in claim 14, wherein said Bragg gratings are non-uniformly spaced.

16. An arbitrary waveform generator for generating an arbitrary or chaotic waveform, the arbitrary waveform generator comprising:

a signal source; and means for generating a non-periodic arbitrary waveform, said generating means including an impulse generator and a modulator for modulating input data applied to said generating means onto said signal source;

wherein said signal source is an optical source which generates light at a single wavelength;

wherein said generating means includes one or more tapped delay lines;

and wherein said one or more tapped delay lines are formed with a plurality of Bragg gratings.

17. The AWG as recited in claim 16, wherein said Bragg gratings are non-uniformly spaced.

* * * * *